United States Patent [19]

Arai

[11] Patent Number: 5,040,010
[45] Date of Patent: Aug. 13, 1991

[54] CAMERA WITH FILM CARTRIDGE HOLDER

[75] Inventor: Akihiro Arai, Tokyo, Japan

[73] Assignee: Asahi Kogaku Kogyo K.K., Tokyo, Japan

[21] Appl. No.: 638,018

[22] Filed: Jan. 7, 1991

Related U.S. Application Data

[63] Continuation of Ser. No. 413,664, Sep. 28, 1989, abandoned.

[30] Foreign Application Priority Data

Oct. 4, 1988 [JP] Japan .................. 63-130353

[51] Int. Cl.⁵ ............................................. G03B 17/02
[52] U.S. Cl. ................................................ 354/288
[58] Field of Search ......................................... 354/288

[56] References Cited

U.S. PATENT DOCUMENTS 4,742,366 5/1988 Nakazawa ............... 354/288

FOREIGN PATENT DOCUMENTS 1098244 1/1968 United Kingdom .

Primary Examiner—Brian W. Brown
Attorney, Agent, or Firm—Sughrue, Mion, Zinn Macpeak & Seas

[57] ABSTRACT

A camera having a main body, a front cover, a rear cover, and a lug. The main body has a light blocking tube, a film cartridge chamber and a spool chamber in which the light blocking tube blocks light other than that entering through a lens from reaching a film. The film cartridge chamber is defined at a side of the light blocking tube so that a film cartridge is housed therein. The spool chamber is defined at the other side of the light blocking tube so that a spool for winding the film is housed inside the spool chamber. The lug projects rearward, and has a bent portion bending outward from a main portion toward a side of the camera, and is formed on the main body of the camera integrally thereto along the film cartridge chamber. The lug presses the film cartridge to keep the film cartridge in proper position, thereby to ensure the automatic feeding of the film.

10 Claims, 2 Drawing Sheets

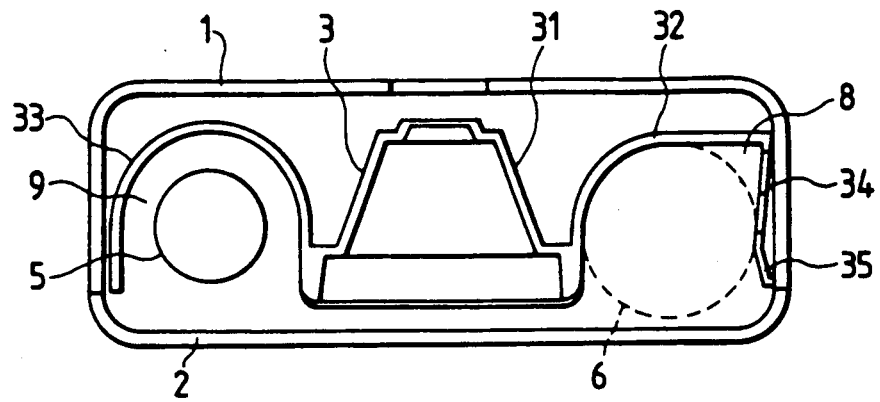
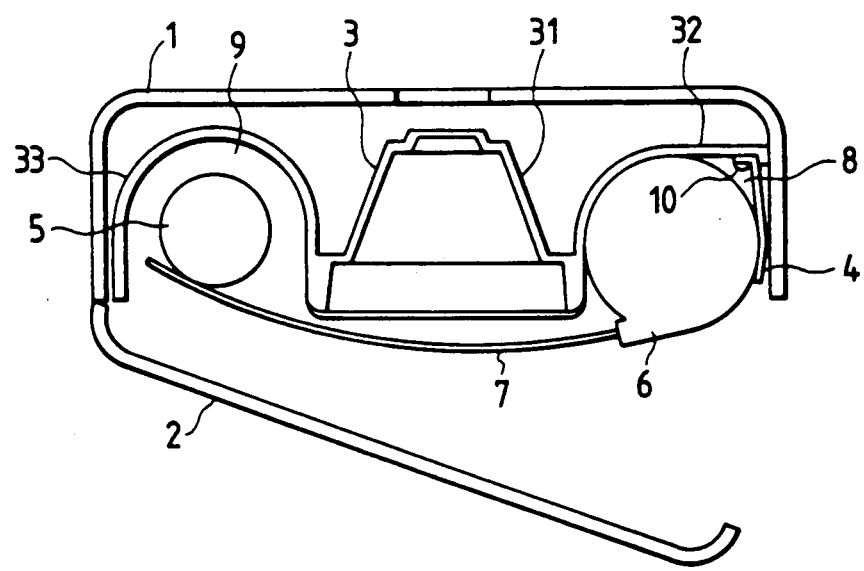
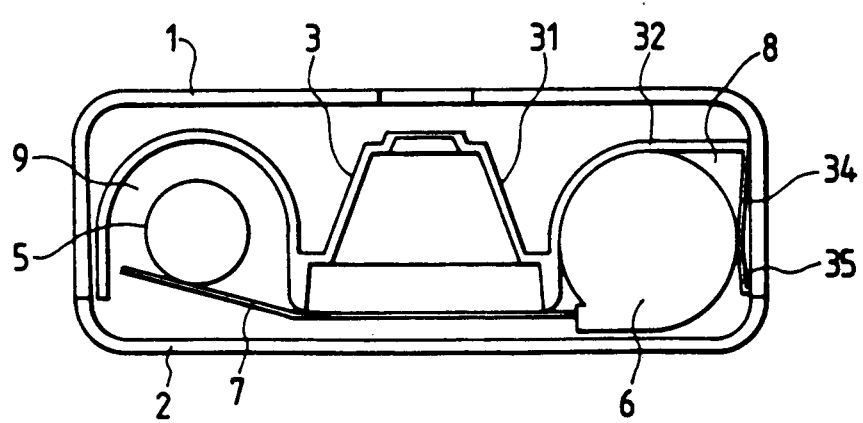

CAMERA WITH FILM CARTRIDGE HOLDER

This is a continuation of application Ser. No. 413,664 filed Sept. 28, 1989, now abandoned.

BACKGROUND OF THE INVENTION

The present invention relates to a camera, particularly to a camera having an improved mechanism for holding a film cartridge.

FIG. 2 shows the constitution of a conventional camera in which a front cover 1 covers the front of the main body 3 of the camera, and a rear cover 2 covers the rear of the main body 3 and can be closed and opened optionally to and from the front cover 1. A light blocking tube 31 shaped nearly as a truncated quadrangular pyramid constitutes the central portion of the main body 3 so that light other than that entering through a lens (not shown in FIG. 2) is blocked from reaching a film 7. The main body 3 has a portion 32 with nearly L-shaped cross section, located at the right of the light blocking tube 31, which defines a film cartridge chamber 8 which houses film cartridge 6. The main body 3 also has a portion 33 with nealy U-shaped cross section, located at the left of the light blocking tube 31, which defines a spool chamber 9 which houses a spool 5 for winding the film 7. A plate spring 4 is secured to the portion 32 by a screw 10 to put pressure on the film cartridge 6 thereby to prevent the film cartridge 6 from moving when the film cartridge 6 is placed in the cartridge chamber 8 to feed the film 7 automatically.

To load the camera, the rear cover 2 is opened, the film cartridge 6 is inserted in the film cartridge chamber 8, the film is pulled out slightly from the cartridge and engaged at the side edge holes of the film with a sprocket (not shown in FIG. 2), and then the rear cover is closed. The film 7 is then wound automatically by a prescribed length on the spool 5 as a motor (not shown in FIG. 2) is driven. In camera of this construction, the spring 4 prevents the film cartridge from moving during the automatic film winding, so that the film is fed properly.

However, since the plate spring 4 is secured to the nearly L-shaped portion 32 by the screw 10 in the conventional camera, the number of parts of the camera and the number of steps of assembling the camera are large, thereby making the cost thereof high. This is a problem.

The present device was made in consideration of the above-mentioned circumstances. In view of the foregoing, it is an object and feature of this invention to provide a camera, in which the number of parts of the camera and the number of steps to assemble the camera are decreased, thereby reducing the cost of the camera.

SUMMARY OF THE INVENTION

The foregoing and other objects and features of the invention have been achieved by the provision of a camera which, according to the present invention, includes a main body, a front cover, and a rear cover. The main body has a light blocking tube, a film cartridge chamber, and a spool chamber. The light blocking tube serves to block light other than that entering through a lens from reaching a film. The film cartridge chamber is defined at a side of the light blocking tube so that a film cartridge is housed in the chamber. The spool chamber is defined at the other side of the light blocking tube so that a spool for winding the film is housed in the chamber. The front cover covers the front of the main body. The rear cover covers the rear of the main body, and can be closed and opened optionally to and from the front cover. A lug projecting rearward, and having a bent portion bent outward from the main portion of the lug toward the side of the camera, is formed on the main body integrally thereto along the film cartridge chamber.

When the front cover of the camera provided according to the present invention is attached to the main body of the camera, the bent portion of the lug is put in contact with the side wall of the front cover so that the lug is deformed elastically to the film cartridge chamber. As a result, when the film cartridge is housed in the film cartridge chamber, the cartridge is pressed by the lug so that the film cartridge is kept from moving, thereby ensuring that the automatic feed of the film is proper. This effect is produced although the number of parts of the camera and the number of steps of assembling the camera are decreased by the above-described constitution of the camera. As a result, the cost of the camera is reduced significantly.

BRIEF DESCRIPTION OF THE DRAWINGS

The above and other objects, features, and advantages of this invention will become more apparent from the following detailed description when read in conjunction with the accompanying drawings in which:

FIG. 1 is a sectional view of an embodiment of a camera according to the present invention in which a film cartridge is not yet housed in the camera;

FIG. 2 is a sectional view of a conventional camera;

FIG. 4 is a sectional view of the embodiment of the camera according to the present invention as shown in FIG. 1 in which the film cartridge is housed in the camera;

DETAILED DESCRIPTION OF THE PREFERRED EMBODIMENT

An embodiment of the present invention is described hereafter with reference to the drawings attached hereto.

Figure 5:
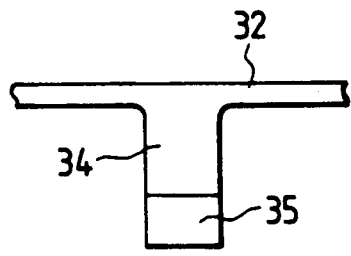
FIG. 5 is a partial side view of the main body of the embodiment of the camera according to the present invention as shown in FIG. 1.

FIG. 1 is a sectional view of a camera of an embodiment according to the present invention. The mutually corresponding & portions of the cameras shown in FIGS. 1 and 2 are denoted by the same reference numerals therein. As shown in FIG. 1, the camera has a front cover 1, a rear cover 2, and a main body 3. The difference between the embodiment of the camera according to the present invention from the conventional camera shown in FIG. 2 is that the right-hand end of the right-hand portion 32 of the main body 3 of the camera shown in FIG. 1 is formed with a plate-like lug 34 (shown in FIG. 5), projecting toward the rear cover 2, and the lug has a bent portion 35 bending outward toward the side of the camera as shown in FIG. 1.

Figure 3:
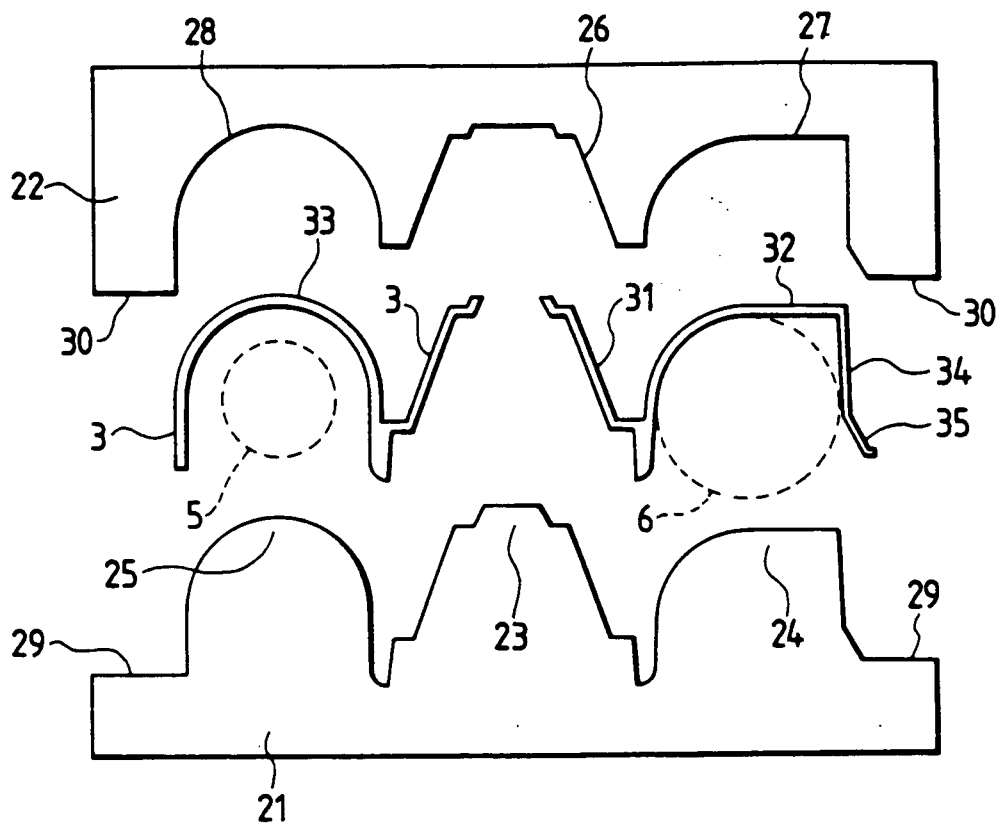
FIG. 3 is a view for explaining the molding of the main body of the embodiment of the camera according to the present invention as shown in FIG. 1.

FIG. 3 shows the main body 3 of the camera shown in FIG. 1, and upper and lower dies 22 and 21 for monolithically molding the main body 3 from a synthetic resin. The lower die 21 has projections 23, 24, and 25 corresponding to the light blocking tube 31, the right-hand portion 32, and the left-hand portion 33 of the main body 3, respectively. The upper die 22 has recesses 26, 27, and 28 corresponding to the projections 23, 24, and 25 of the lower die 21, respectively. The angle between the right-hand portion 32 of the main body 3 and the plate-like lug 34 is made obtuse or nearly right, so that the front and rear parts of the front portion of the lug 34 extend continuously toward each other so as to be nearly parallel to the axis of the light blocking tube 31 of the main body 3. Alternatively, the front part of the front portion of the lug 34 is located inwardly of the rear part of the front portion thereof thereby to make the film cartridge chamber 8 of the camera divergent rearward.

When the main body 3 is molded by the upper and lower dies 22 and 21, the height of the meeting surfaces 29 and 30 of the dies 21 and 22, respectively, is made nearly equal to that of the tip of the bent portion 35 of the plate-like lug 34 of the main body 3 to facilitate separating the dies 21 and 22 from each other. Although the main body 3 could be molded so as to place the front part of the front portion of the plate-like lug 34 outside the rear part of the front portion thereof as shown in FIG. 1, the number of dies 21 and 22 would not be large enough for the molding, and thus the molding would be more complicated.

When the front cover 1 is attached to the main body 3 as shown in FIG. 1, the tip of the bent portion 35 of the lug 34, which is bent outward from the front portion of the lug 34, is put in contact with the inside surface of the side wall of the front cover 1 so that the lug 34 is deformed elastically and warped slightly toward the film cartridge chamber 8. Thereafter, when a film cartridge 6 is set in the film cartridge chamber 8, the wall of the cartridge 6 is put in contact with the lug 34 so that the lug is further deformed elastically. As a result, the film cartridge 6 is held in the film cartridge chamber 8 by the deformation pressure of the lug 34 so that the cartridge 6 is prevented from moving relative to the main body 3 of the camera. Thereafter, a film 7 is pulled out slightly from the film cartridge 6 and engaged at the side edge holes of the film with a sprocket (not shown in the drawings). Then, the rear cover 2 is closed to the front cover 1. Since the film cartridge 6 is held in the film cartridge chamber 8 so as not to move relative to the main body 3, the film 7 is prevented from being disengaged at the side edge holes thereof from the sprocket. As a result, the feed of the film is proper.

Figure 6:
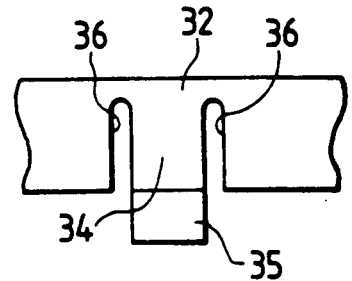
FIG. 6 is a partial side view of a modification of the main body of the embodiment of the camera according to the present invention as shown in FIG. 1.

As shown in FIG. 6, notches 36 may be provided in the right-hand portion 32 of the main body 3 at both sides of the lug 34 to make it easier to elastically deform the lug 34.

As described above, according to the present invention, the main body of a camera is formed integrally with a lug having an outwardly bent portion, so that the number of parts of the camera and the number of steps to assemble it are decreased. Hence, the cost of the camera is reduced, and its operability is improved significantly.

While certain preferred embodiments have been shown and described, many changes and modifications within the spirit of the invention will be apparent to those of working skill in this technical field. Thus, the scope of the invention should be considered as limited only by the appended claims.

What is claimed is:

1. A camera having a main body with front and rear sides and first and second lateral sides, a front cover covering said front side, and a rear cover covering said rear side and which can be opened and closed relative to said front cover, said main body comprising:
   a light blocking tube disposed so that light other than that entering through a lens is blocked from reaching a film contained in said main body;
   a film cartridge chamber defined at a first side of said light blocking tube between said light blocking tube and said first lateral side for housing a film cartridge;
   a spool chamber defined at the other side of said light blocking tube for housing a spool for winding said film; and
   a lug extending along a side of said film cartridge chamber adjacent said first lateral side and having a rearward projecting main portion and a bent portion bent outward from said main portion of said lug toward said first lateral side of said camera, said lug being simultaneously formed with said main body by molding as a single integral piece.

2. A camera according to claim 1, wherein said main body is molded with two dies having meeting surfaces, and wherein said bent portion has a tip extending in a direction substantially parallel to said front and rear sides, said tip of said bent portion being disposed on said meeting surfaces of said two dies when said main body is molded with said two dies.

3. A camera according to claim 1, wherein said main body has a portion provided with notches defining sides of said lug.

4. A camera according to claim 1, wherein said main portion of said lug is inclined inwardly.

5. A camera according to claim 1, wherein said light blocking tube has an axis and is formed in a camera main body having a right-hand portion at said first side of said light blocking tube, and wherein the angle between said right-hand portion of said main body and said lug is made obtuse or nearly right, so that said lug extends so as to be nearly parallel to the axis of said light blocking tube of said main body.

6. In a camera having front and rear sides and first and second lateral sides, a holding mechanism for a film cartridge, said holding mechanism comprising:
   a first member for defining a film cartridge chamber for housing said film cartridge adjacent said first lateral side of said camera; and
   a holding lug extending along a side of said film cartridge chamber adjacent said first lateral side and having a rearward projecting main portion and a bent portion bent outward from said main portion of said lug toward said first lateral side of said camera, said lug being simultaneously formed as a single piece with said first member by molding as a side contact wall of said chamber so as to be elastically deformed upon insertion of said film cartridge into said chamber.

7. A holding mechanism according to claim 6, wherein said camera has front and rear sides and wherein said first member is molded with two dies having meeting surfaces said bent portion having a tip extending in a direction substantially parallel to said front and rear sides and which is disposed on said meeting surfaces of said two dies when said first member is molded with said two dies.

8. A holding mechanism according to claim 6, wherein said first member has a portion provided with notches defining sides of said lug.

9. A holding mechanism according to claim 6, wherein said main portion of said lug is inclined inwardly.

10. A holding mechanism according to claim 6, wherein said first member includes a light blocking tube having an axis and has a right-hand portion defining said film cartridge chamber, and wherein the angle between said right-hand portion of said first member and said lug is made obtuse or nearly right, so that said lug extends so as to be nearly parallel to the axis of said light blocking tube.

* * * * *